United States Patent [19]

Miller

[11] Patent Number: 4,943,424

[45] Date of Patent: Jul. 24, 1990

[54] SYNTHESIS OF A CRYSTALLINE SILICOALUMINOPHOSPHATE

[75] Inventor: Stephen J. Miller, San Francisco, Calif.

[73] Assignee: Chevron Research Company, San Francisco, Calif.

[21] Appl. No.: 155,191

[22] Filed: Feb. 12, 1988

[51] Int. Cl.$^5$ ............................................. C01B 33/26
[52] U.S. Cl. ..................................... 423/328; 423/306
[58] Field of Search ............... 423/306, 305, 326, 328, 423/329, 331, 332; 502/214

[56] References Cited

U.S. PATENT DOCUMENTS 4,394,362  7/1983  Miller .................................. 423/329
4,440,871  3/1984  Lok et al. ............................ 502/214

*Primary Examiner*—Robert L. Stoll
*Assistant Examiner*—R. Bruce Breneman
*Attorney, Agent, or Firm*—T. G. De Jonghe; V. J. Cavalieri

[57] ABSTRACT

A silicoaluminophosphate molecular sieve is disclosed and is characterized in that the $P_2O_5$ to alumina mole ratio at the surface is about 0.80 or less, the $P_2O_5$ to alumina mole ratio of the bulk is 0.96 or greater and the silicon content at the surface is greater than that of the bulk.

19 Claims, 1 Drawing Sheet

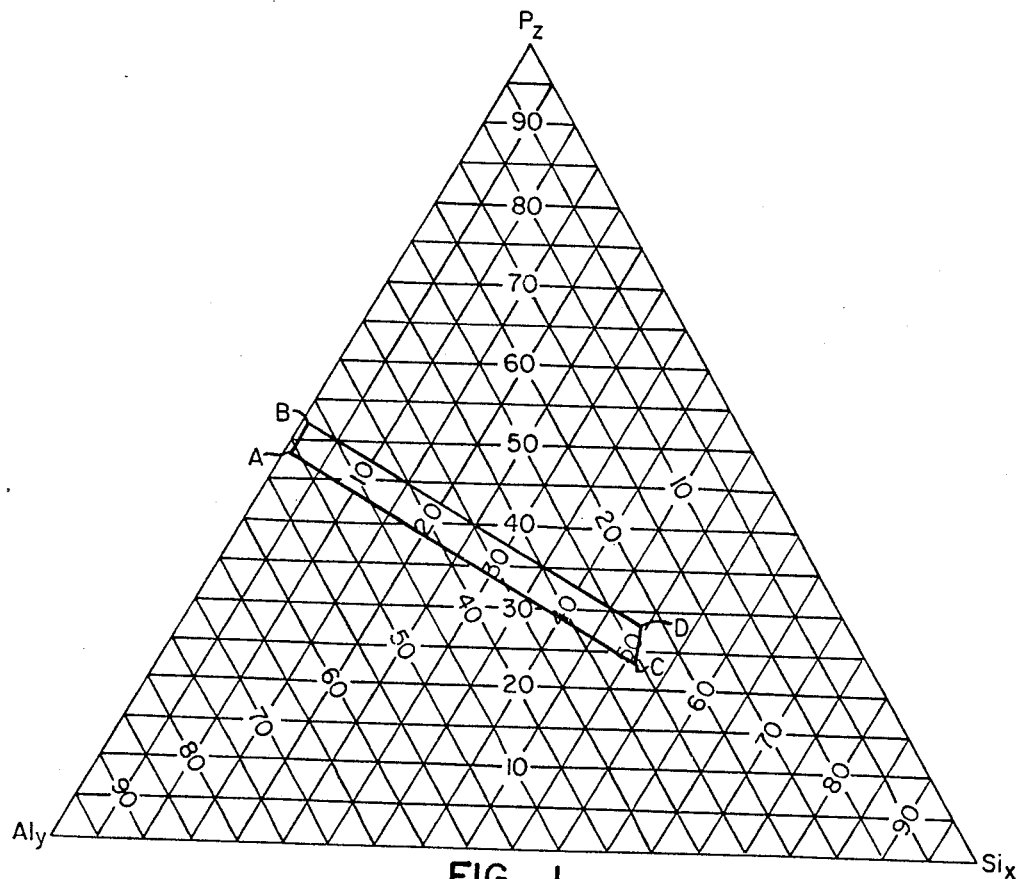
FIG._1.
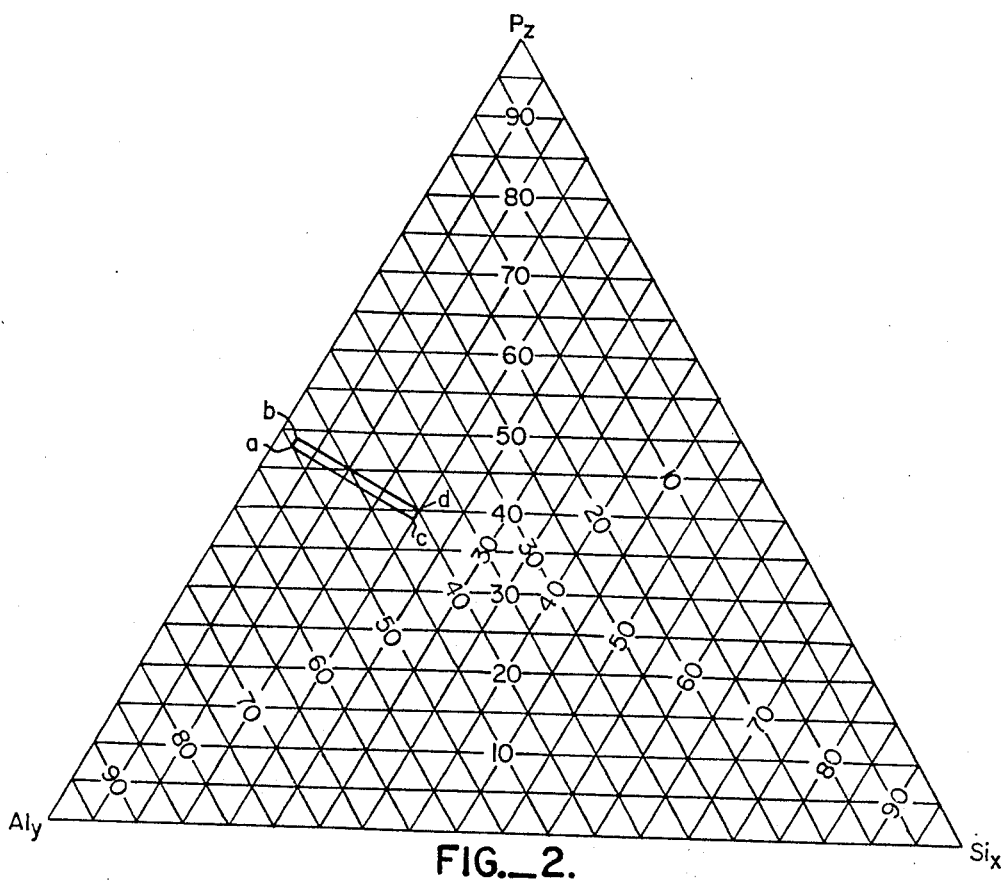
FIG._2.

SYNTHESIS OF A CRYSTALLINE SILICOALUMINOPHOSPHATE

BACKGROUND OF THE INVENTION

This invention relates to a crystalline silicoaluminophosphate molecular sieve and to its synthesis. It more particularly relates to the synthesis of a crystalline silicoaluminophosphate molecular sieve which has a bulk $P_2O_5/Al_2O_3$ mole ratio and bulk $SiO_2/Al_2O_3$ mole ratio different from their corresponding surface $P_2O_5/Al_2O_3$ and surface $SiO_2/Al_2O_3$ mole ratios Silicoaluminophosphates are taught in U.S. Pat. No. 4,440,871, for example. Silicoaluminophosphate materials are both microporous and crystalline and have a three-dimensional crystal framework of $PO_2^+$, $AlO_2^-$ and $SiO_2$ tetrahedral units and, exclusive of any alkali metal or other cation which may optionally be present, an as-synthesized empirical chemical composition on an anhydrous basis of:

$$mR:(Si_xAl_yP_z)O_2$$

wherein "R" represents at least one organic templating agent present in the intracrystalline pore system; "m" represents the moles of "R" present per mole of $(Si_xAl_yP_z)O_2$ and has a value of from 0 to 0.3, the maximum value in each case depending upon the molecular dimensions of the templating agent and the available void volume of the pore system of the particular silicoaluminophosphate species involved; "x", "y", and "z" represent the mole fractions of silicon, aluminum, and phosphorus, respectively, present as tetrahedral oxides. The minimum value for each "x", "y", and "z" is 0.01 and preferably 0.02. The maximum value for "x" is 0.98; for "y" is 0.60; and for "z" is 0.52.

It is disclosed in U.S. Pat. No. 4,440,871 that while it is not essential to the synthesis of SAPO compositions, it has been found that in general, stirring or other moderate agitation of the reaction mixture and/or seeding the reaction mixture with seed crystals of either the SAPO species to be produced or a topologically similar aluminophosphate or aluminosilicate composition, facilitates the crystallization procedure. These silicoaluminophosphates exhibit several physical and chemical properties which are characteristic of aluminosilicate zeolites and aluminophosphates.

Silicoaluminophosphate SAPO-11 and its conventional method of preparation are taught by U.S. Pat. No. 4,440,871.

SUMMARY OF THE INVENTION

The present invention is directed to a novel synthetic crystalline silicoaluminophosphate molecular sieve, hereinafter designated SM-3. In general, the SM-3 silicoaluminophosphate can be characterized to distinguish it from all other silicoaluminophosphate forms as being a silicoaluminophosphate having a phosphorus, silicon, and aluminum concentration at the molecular sieve surface that is different than the phosphorus, silicon, and aluminum concentration in the bulk of the molecular sieve, and having the essential X-ray diffraction pattern of SAPO-11.

More specifically, the present invention is directed to a crystalline silicoaluminophosphate molecular sieve as synthesized having a composition in terms of mole ratio of oxides on an anhydrous basis expressed by the formula:

$$mR:Al_2O_3:nP_2O_5:qSiO_2 \qquad (1)$$

wherein "R" represents at least one organic templating agent present in the intracrystalline pore system; "m" represents the moles of "R" present and has a value such that there are from 0.02 to 2 moles of R per mole of aluminum; n has a value of from 0.96 to 1.1, and q has a value of from 0.1 to 4, said silicoaluminophosphate having a characteristic X-ray powder diffraction pattern which contains at least the d-spacing of Table I, and wherein the $P_2O_5$ to alumina mole ratio of the surface of the silicoaluminophosphate is about 0.80 or less, the $P_2O_5$ to alumina mole ratio of the bulk of the silicoaluminophosphate is 0.96 or greater, and the $SiO_2$ to alumina mole ratio at the surface of the silicoaluminophosphate is greater than the $SiO_2$ to alumina mole ratio in the bulk of the silicoaluminophosphate.

Also, a method is provided for the synthesis of SM-3 crystalline silicoaluminophosphate, which method comprises:

(a) preparing an aqueous reaction mixture containing a reactive source of $SiO_2$, aluminum isopropoxide, phosphoric acid, and an organic templating agent, said reaction mixture having a composition expressed in terms of mole ratio of oxides as follows:

$$aR:Al_2O_3:0.9-1.2P_2O_5:0.1-4.0SiO_2:bH_2O$$

wherein R is an organic templating agent; "a" has a value large enough to constitute an effective amount of R and preferably has a value such that there are from 0.20 to 2 moles of R per mole of aluminum oxide; "b" has a value such that there are 10 to 40 moles of $H_2O$ per mole of aluminum oxide; said reaction mixture having been formed by combining the alumina and phosphorus sources in the substantial absence of the silicon source and thereafter combining the resulting mixture sequentially with the silicon source and the organic templating agent to form the complete reaction mixture;

(b) adjusting the pH of the reaction mixture from about 6.0 to 8.5;

(c) heating the reaction mixture to a temperature in the range of from 170° C. to 240° C. until crystals of silicoaluminophosphate are formed; and (d) recovering said crystals.

Among other factors, the present invention is based on my finding that by controlling reaction conditions, a new silicoaluminophosphate molecular sieve may be formed which has a bulk composition which is different from its surface composition. By controlling the distribution and position of the silicon on the surface of the silicoaluminophosphate, the activity of the silicoaluminophosphate as a catalyst is increased while maintaining its selectivity.

IN THE DRAWINGS

FIG. 1 is a ternary diagram showing the compositional parameters of the silicoaluminophosphate of this invention in terms of mole fractions of silicon, aluminum and phosphorous.

FIG. 2 is a ternary diagram showing the preferred compositional parameters of the silicoaluminophosphates of this invention in terms of mole fractions of silicon, aluminum and phosphorous.

DETAILED DESCRIPTION OF THE INVENTION

The silicoaluminophosphate material of the present invention will exhibit unique and useful catalytic and shape selective properties. The activity usually is determined by comparing the temperature at which various catalysts must be utilized under otherwise constant reaction conditions with the same hydrocarbonaceous feedstocks and the same conversion rate of products. The lower the reaction temperature for a given extent of reaction, the more active the catalyst is for the specified process. The silicoaluminophosphate of the present invention, which is a SAPO-11-type silicoaluminophosphate, shows superior activity as compared to SAPO-11 prepared by the conventional method as taught in U.S. Pat. No. 4,440,871, and at the same time, possesses the same or improved advantageous selectivity properties of the known SAPO-11 silicoaluminophosphate. The selectivity is a measure of the yield of a desired product.

The novel SM-3 silicoaluminophosphate, as-synthesized, has a crystalline structure whose X-ray powder diffraction pattern shows the following characteristic lines.

TABLE I

| $2\theta$ | d | $100 \times I/I_o$ |
|---|---|---|
| 9.4–9.65 | 9.41–9.17 | m |
| 20.3–20.6 | 4.37–4.31 | m |
| 21.0–21.3 | 4.23–4.17 | vs |
| 22.1–22.35 | 4.02–3.99 | m |
| 22.5–22.9 (doublet) | 3.95–3.92 | m |
| 23.15–23.35 | 3.84–3.81 | m–s | m = 20–70
s = 70–90
vs = 90–100

The X-ray powder diffraction patterns were determined by standard techniques. The radiation was the K-alpha/doublet of copper and a scintillation counter spectrometer with a strip-chart pen recorder was used. The peak heights I and the positions, as a function of $2\theta$, where $\theta$ is the Bragg angle, were read from the spectrometer chart. From these measured values, the relative intensities $100 I/I_o$, where $I_o$ is the intensity of the strongest line or peak and d, the interplanar spacing in Angstroms corresponding to the recorded lines, can be calculated. The X-ray diffraction pattern of Table I is characteristic of novel SM-3 silicoaluminophosphate and corresponds to the X-ray diffraction pattern for SAPO-11 as disclosed in U.S. Pat. No. 4,440,871, which is incorporated totally herein by reference.

After calcination, the SM-3 silicoaluminophosphate has a crystalline structure whose X-ray powder diffraction pattern shows the following characteristic lines as indicated in Table II below:

TABLE II

| $2\theta$ | d | $100 \times I/I_o$ |
|---|---|---|
| 8.1 | 10.92 | m |
| 9.85 | 8.98 | m |
| 12.8 | 6.92 | m |
| 16.1 | 5.5 | m |
| 21.95 | 4.05 | vs |
| 22.3–22.5 | 3.99–3.95 | m |
| 23.5 | 3.786 | m |

The SM-3 silicoaluminophosphate molecular sieve as synthesized is characterized as comprising a three-dimensional microporous crystal framework structure of $[SiO_2]$, $[AlO_2]$, and $[PO_2]$ tetrahedral units which has a composition in terms of mole ratio of oxides on an anhydrous basis expressed by the formula:

$$mR:Al_2O_3:nP_2O_5:qSiO_2 \quad\quad (I)$$

wherein "R" represents at least one organic templating agent (hereinafter also referred to as "template") present in the intracrystalline pore system; "m" represents the moles of "R" present and has a value such that there are from 0.02 to 2 moles of R per mole of alumina; n has a value of from 0.96 to 1.1 and preferably 0.96 to 1, and q has a value of from 0.1 to 4 and preferably 0.1 to 1.

The SM-3 silicoaluminophosphate molecular sieve as synthesized may also be expressed in terms of its unit empirical formula. On an anhydrous basis it is expressed by the formula:

$$mR:(Si_xAl_yP_z)O_2 \quad\quad (II)$$

wherein R and m are defined hereinabove; "x", "y", and "z" represent the mole fractions of silicon, aluminum, and phosphorus, respectively, present as tetrahedral oxide units, said mole fractions being within the tetragonal compositional area defined by points, A, B, C, and D of the ternary compositional diagram depicted by FIG. 1 of the drawings where the points A, B, C, and D are represented by the following values for "x", "y", and "z":

| Point | Mole Fraction | | |
| | x | y | z |
|---|---|---|---|
| A | 0.02 | 0.50 | 0.48 |
| B | 0.02 | 0.47 | 0.51 |
| C | 0.51 | 0.25 | 0.24 |
| D | 0.49 | 0.24 | 0.27 |

In a preferred embodiment the values for "x", "y", and "z", in the Formula (II) above are within the tetragonal compositional area defined by the points a, b, c, and d of the ternary diagram which is FIG. 2 of the drawings, wherein said points a, b, c, and d are represented by the following values for "x", "y", and "z":

| Point | Mole Fraction | | |
| | x | y | z |
|---|---|---|---|
| a | 0.2 | 0.50 | 0.48 |
| b | 0.02 | 0.49 | 0.49 |
| c | 0.2 | 0.41 | 0.39 |
| d | 0.2 | 0.40 | 0.40 |

The SM-3 silicoaluminophosphate of this invention is further characterized in that the $P_2O_5$ to alumina mole ratio at the surface of the silicoaluminophosphate is about 0.80 or less and preferably in the range of 0.80 to 0.55, the $P_2O_5$ to alumina mole ratio of the bulk of the silicoaluminophosphate is 0.96 or greater, preferably in the range of 0.96 to 1.1, and most preferably in the range of 0.96 to 1, and the $SiO_2$ to alumina mole ratio at the surface of the silicoaluminophosphate is greater than the $SiO_2$ to alumina mole ratio within the bulk of the silicoaluminophosphate.

In the sieve of this invention, the silicon content, as evidenced by the silica to alumina mole ratio at the surface of the silicoaluminophosphate is greater than in the bulk of the sieve.

By the term "silicon content at the surface of the sieve" is meant the amount of silicon at the surface of the sample as can be measured using X-ray photoelectron spectroscopy surface analysis (ESCA); this silicon content will include any amorphous silica that is present. The sieves of this invention have higher silicon contents at the surface than in the bulk. In this comparison, either silica contents per se or the silica/alumina ratios can be compared.

The term "unit empirical formula" is used herein according to its common meaning to designate the simplest formula which gives the relative number of atoms of silicon, aluminum, and phosphorus which form a $[PO_2]$, $[AlO_2]$, and $[SiO_2]$ tetrahedral unit within a silicoaluminophosphate molecular sieve and which forms the molecular framework of the SM-3 composition. The unit empirical formula is given in terms of silicon, aluminum, and phosphorus as shown in Formula (II), above, and does not include other compounds, cations, or anions which may be present as a result of its preparation or the existence of other impurities or materials in the bulk composition not containing the aforementioned tetrahedral unit as the molecular framework. The amount of template R is part of the composition when the as-synthesized unit empirical formula is given, and water may also be reported unless such is defined as the anhydrous form. For convenience, coefficient "m" for template "R" is reported as a value that is normalized by dividing the number of moles of R by the total number of moles of alumina. When moles of water are reported the moles of water is reported as a value that is normalized by dividing the number of moles of water by the total moles of alumina. The values for x, y, and z are determined by dividing the number of moles of silicon, aluminum, and phosphorus individually by the total number of moles of silicon, aluminum, and phosphorus.

The composition of Formula (I) as well as the unit empirical Formula (II) for an SM-3 silicoaluminophosphate may be given on an "as-synthesized" basis or may be given after an "as-synthesized" SM-3 composition has been subjected to some post-treatment process, e.g., calcination. The term "as-synthesized" herein shall be used to refer to the SM-3 composition formed as a result of the hydrothermal crystallization but before the SM-3 composition has been subjected to post-treatment to remove any volatile components present therein.

The actual value of "m" for a post-treated SM-3 will depend on several factors (including: template, severity of the post-treatment in terms of its ability to remove the template from the SM-3, the proposed application of the SM-3 composition, etc.). The amount of template for the post-treated SM-3 can be within the range of values as defined for the as-synthesized SM-3 composition, although it is generally less. An SM-3 composition which is in the calcined or other post-treated form generally has a composition represented by the Formula (I) or an empirical formula represented by Formula (II), except that the value of "m", generally ranges from 0 to 0.3 moles of template per mole of alumina and most preferably from 0 to 0.1 and is generally less than about 0.02. Under sufficiently severe post-treatment conditions, e.g., roasting in air at high temperature for long periods (over 1 hour), the value of "m" may be zero (0) or, in any event, the template, R, is undetectable by normal analytical procedures.

In synthesizing the SM-3 composition of the present invention, it is preferred that the reaction mixture be essentially free of alkali metal cations, and accordingly a preferred reaction mixture composition expressed in terms of mole ratio of oxides is as follows:

$$aR:Al_2O_3:0.9-1.2P_2O_5:0.1-4.0SiO_2:bH_2O$$

wherein "R" is an organic templating agent; "a" has a value great enough to constitute an effective concentration of "R" and preferably has a value such that there are from about 0.20 to 2 moles of R per mole of alumina and more preferably about 0.8 to 1.2; "b" has a value such that there is 10 to 40 moles of $H_2O$ per mole of aluminum oxide, preferably 15 to 36.

In the synthesis method of the present invention, an aqueous reaction mixture is formed by combining the reactive aluminum and phosphorus sources in the substantial absence of the silicon source and thereafter combining the resulting reaction mixture comprising the aluminum and phosphorus sources with the silicon source and thereafter combining the mixture with the template. If alkali metal cations are present in the reaction mixture, they should be present in sufficiently low concentrations that it does not interfere with the formation of the SM-3 composition.

Any inorganic cations and anions which may be present in the reaction mixture are generally not provided by separately added components. Rather, these cations and anions will frequently come from compounds added to the reaction mixture to provide the other essential components such as the silicon source or such as the organic templating agent or any pH adjustment agents which may be used.

More specifically, the synthesis method comprises:

(a) preparing an aqueous reaction mixture containing aluminum isopropoxide and phosphoric acid, and thereafter combining the resulting mixture with a silicon oxide source followed by combining this mixture with an organic templating agent to form the complete reaction mixture in the relationship hereinbefore set forth;

(b) adjusting the pH of the reaction mixture at the start of the reaction to about 6.0 to 8.5 and preferably in the range of from 6.0 to 8.0;

(c) heating the reaction mixture to a temperature in the range of from 170° C. to 240° C. and preferably from 180° C. to 225° C. until crystals are formed, usually from 5 hours to 500 hours and preferably 24 to 500 hours; and (d) recovering the crystalline SM-3 silicoaluminophosphate.

The crystallization is conducted under hydrothermal conditions under pressure and usually in an autoclave so that the reaction mixture is subject to autogenous pressure and preferably with no stirring. Following crystallization of the SM-3 material, the reaction mixture containing same is filtered and the recovered crystals are washed, for example, with water, and then dried, such as by heating at from 25° C. to 150° C. at atmospheric pressure. Preferably the supernatant liquid above the crystals is removed prior to the initial filtering of the crystals.

The SM-3 prepared by the present method is beneficially subjected to thermal treatment to remove the organic templating agent. This thermal treatment is generally performed by heating at a temperature of 300° C. to 1000° C. for at least 1 minute and generally not longer than 20 hours. While subatmospheric pressure can be employed for the thermal treatment, atmospheric pressure is desired for reasons of convenience. The thermally treated product is particularly useful in the catalysis of certain hydrocarbon conversion reactions.

Adding the silicon component last after well mixing the aluminum and phosphorus components results in high purity SM-3-type material.

The SM-3 silicoaluminophosphate is prepared at low pH, in the range of from about 6.0 to about 8.5 and preferably from 6.0 to 8.0, and an $H_2O/Al_2O_3$ mole ratio of about 10 to 40 and preferably 15 to 36. Under these conditions, $SiO_2$ depolymerization is slow and nucleation is rapid. Crystallization under the reaction conditions of this invention is generally complete in less than 5 hours.

While not intending to be limited to theory, it appears $SiO_2$ does not enter the structure until late in crystallization such that under the conditions of the process of this invention, in the early phases of the reaction, there is produced a near aluminophosphate phase surrounded by a $SiO_2$-rich amorphous phase. As $PO_4^{-3}$ is depleted by reaction with $Al^{+3}$ species, the pH of the mixture rises to about 10 to about 10.5. This increases the dissolution of $SiO_2$ permitting silica incorporation into the structure such that a silicoaluminophosphate shell forms around the aluminophosphate core. From a macroscopic point of view, the sieve could almost be considered a crystalline aluminophosphate, since the $P_2O_5$ to alumina mole ratio within the bulk of the SM-3 silicoaluminophosphate is 0.96 or greater and preferably from 0.96 to 1.

The surface silica rich phase on the outside of the sieve contains a higher $SiO_2$/alumina ratio than the bulk. Material with higher surface silica to alumina ratios appears to show increased acidity and increased activity.

By controlling the pH and the $H_2O/Al_2O_3$ ratio of the mix, the thickness of the SM-3 shell can be adjusted. One way to reduce the thickness, for example, is by adding additional $H_3PO_4$ to the mix. This will hold down the final pH, i.e., control the acidity, so that Si is not incorporated until the very end of the synthesis.

If necessary, the pH can be lowered into the proper region using acids such as HCl or $H_3PO_4$. The latter may be preferred, since having a slight excess of $PO_4^{-3}$ will help ensure that the $PO_4^{-3}$ concentration is never so low that the alumina and silica components have nothing to react with but each other.

An excess of water over the described range tends to lead to rapid incorporation of silica into the product. Excess water also leads to larger crystals which may diminish activity due to diffusion constraints. In the present invention, a crystallite size of less than 1 micron is produced with an average size less than 0.5 micron.

The activity of the SM-3 silicoaluminophosphate is improved as the synthesis temperature is increased, at least up to 240° C. The high temperature appears to enhance crystal growth and, therefore, the degree of crystallinity of the product. It also tends to give a more complete Si incorporation which leads to more active sites.

The organic template or directing agent is selected from di-n-propylamine and di-isopropylamine or mixtures thereof.

The useful sources of silicon oxide include any one form of silicic acid or silicon dioxide, alkoxy- or other compounds of silicon. Preferably, a form of silicon oxide known as Cab-o-Sil is used.

The special characteristics of the catalyst result from its surface composition as determined by X-ray photoelectron spectroscopy surface analysis (ESCA), Lucchesi, E. A., et al., *Jour. Chem. Ed.* 50(5):A269 (May 1973) and Kelley, M. J., *CHEMTECH,* 99–105 (Feb. 1982). The term "surface" refers to both the outermost layer of atoms and to a volume that extends about 50 angstroms below the outermost layer. The ESCA determination is a weighted average of the concentration in these layers, the weighting factor decreasing exponentially toward the interior.

A Hewlett Packard 5950A ESCA Spectrometer was used to measure the atomic ratios of elemental phosphorous, silicon, aluminum and oxygen.

The instrument was run alternately scanning the bands of interest and the oxygen is band. This scanning method allowed for a straight line normalization of all of the band intensities relative to the oxygen 1s, thereby correcting for the decrease in sensitivity of the detector over the time required to analyze the sample.

Relative intensities were corrected using the following response factors, rather than theoretical Scofield cross sections. These response factors were determined by calibrations using amorphous aluminum phosphate, alumina, silica, sodium hydrogen phosphate and aluminum sulfate, and are similar to those found in Wagner, et al., *Surf. Inter. Anal.,* 3, 211 (1981) and S. Evans, et al., *J. Electron Spectros Rel. Phenom.* 14, 341 (1978).

| Element | Band | Observed Relative Intensity | Scofield Relative Intensity |
|---|---|---|---|
| O  | 1s | 1.00 | 1.00 |
| Al | 2p | 0.21 | 0.18 |
| Al | 2s | 0.29 | 0.26 |
| Si | 2p | 0.35 | 0.28 |
| Si | 2s | 0.39 | 0.33 |
| P  | 2p | 0.55 | 0.41 |
| P  | 2s | 0.45 | 0.40 |

For each of the elements, silicon, aluminum and phosphorus, the amount of the element at the surface was calculated based on the intensity of both the 2s and 2p bands, which were weighted using the square root of the above response factors for each of these bands. Once the amount of each element was determined, atomic ratios and weight ratios and mole ratios were readily calculated.

Observed variances in individual elemental concentrations are about 10%. However, the ratios of the elements can be determined more accurately, typically within 5%.

Bulk elemental determinations of silicon, aluminum and phosphorus were made using the following procedure. This method first fused the molecular sieve sample with lithium metaborate, $LiBO_2$, and then dissolved the molten-fused bead in nitric acid solution. The resulting solution was analyzed by the Inductively Coupled Plasma (ICP) technique using matrix-matched standards. A Model 3580 ICP sold by Applied Research Laboratories (ARL), California, was used.

Solutions for analysis were prepared by mixing 0.1 g of the sample with 1.4 g of $LiBO_2$ in a preignited graphite crucible. This mixture was fused in a muffle furnace set at 1000° C. for 14 minutes. The crucible was immediately removed from the furnace, and, with a uniform motion, the molted fused-bead was poured into 60 mL of a 4% v/v $HNO_3$ acid solution in a polyethylene beaker. The fused salts were agitated until dissolved and then a 5 ppm scandium internal standard, diluted from a 1% concentrate purchased from VHG Laboratories, Andover, Mass. was added. The resulting solution was diluted to 1 liter.

The sample weight was corrected to account for any water and residual organics by adjusting the sample weight for the % loss of ignition (LOI). A dry crucible containing a known weight of the sample was heated at 1000° C. for 2 hours, and cooled to room temperature in a dessicator. The % LOI was calculated:

$$\% \ LOI = 100 \times \frac{\text{Weight Before} - \text{Weight After}}{\text{Weight After}}$$

The sample weight was corrected for the % LOI.

$$\text{Corrected sample weight} = \text{sample weight} \times \frac{100 - \% \ LOI}{100}$$

The corrected sample weight was used to determine the weight percent of silicon, aluminum, and phosphorus via ICP, based on the instrument response of the sample compared to a calobration curve for each element and the dilution factor (total volume/corrected sample weight) associated with each sample.

The calibration curve for each element was determined by preparing aqueous calibration standards (matrix-matched) in the manner described above for sample preparation, except no sample was added. Instead, just prior to diluting to 1 liter, known amounts of aqueous Al, P and Si standards purchased from VHG were added. Once the amount of each element was determined, atomic ratios, weight ratios and mole ratios were readily calculated.

The SM-3 synthesized hereby can be used as catalyst in intimate combination with a metal component such as silver, tungsten, vanadium, molybdenum, rhenium, chromium, manganese, or a Group VIII metal, preferably platinum or palladium where, for example, a hydrogenation-dehydrogenation or oxidation function is to be performed. Such a component can be ion-exchanged into the composition, impregnated therein or intimately physically admixed therewith. Such component can be impregnated into or onto the composition, such as, for example, in the case of platinum, by treating the crystal with a solution containing a platinum metal-containing ion. Thus, suitable platinum compounds include chloroplatinic acid, platinous chloride, and various compounds containing the platinum amine complex.

The original ions, i.e., cations or anions, of the as-synthesized SM-3 can be replaced in accordance with techniques well known in the art, at least in part, by ion-exchange with other cations or anions. Preferred replacing cations include metal ions, hydrogen i, hydrogen precursor, e.g., ammonium, ions and mixtures thereof. Particularly preferred cations include hydrogen, rare earth metals, and metals of Groups IIA, IIIA, IVA, IB, IIB, IIIB, IVB, VIB, and VIII of the Periodic Table of the Elements.

A typical ion-exchange technique would be to contact the synthetic crystalline SM-3 with a salt of the desired replacing ion or ions. Examples of such salts of cations include the halides, e.g., chlorides, nitrates, and sulfates.

Further, the present SM-3, when employed either as an adsorbent, ion-exchanger, or as a catalyst in an organic compound conversion process should be dehydrated, at least partially. This can be done by heating to a temperature in the range of 200° C. to 600° C. in air or an inert atmosphere, such as nitrogen, etc., and at atmospheric, subatmospheric, or superatmospheric pressures for between 30 minutes and 48 hours. Dehydration can also be performed at room temperature merely by placing the crystalline material in a vacuum, but a longer time is required to obtain a sufficient amount of dehydration. Therefore, depending upon the degree of dehydration or thermal treatment desired for the SM-3, it may be subjected to heating at a temperature of from 200° C. to 1000° C. for a time of from 1 minute to 48 hours.

The crystals of SM-3 prepared by the instant invention can be shaped into a wide variety of particle sizes. Generally speaking, the particles can be in the form of a powder, a granule, or a molded product, such as an extrudate having a particle size sufficient to pass through a 2-mesh (Tyler) screen and be retained on a 400-mesh (Tyler) screen. In cases where the composition is molded, such as by extrusion, the crystals can be extruded before drying or partially dried and then extruded.

In the case of many catalysts, it is desired to incorporate the SM-3 with another material resistant to the temperatures and other condition employed in organic conversion processes. Such materials include active and inactive material and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the SM-3, i.e., combined therewith, which is active, tends to improve the conversion and/or selectivity of the catalyst in certain organic conversion processes. Inactive materials suitably serve as diluents to control the amount of conversion in a given process so that products can be obtained economically without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin families which include the subbentonites, and the kaolins commonly known as Dixie, McNamee, Georgia, and Florida clays or others in which the main mineral constituent is halloysite, kaolinite, dickite, nacrite, or anauxite. Such clays can be used in the raw state as originally mined or initially subjected to calcination, acid treatment, or chemical modification. Binders useful for compositing with the present crystal also include inorganic oxides, notably alumina or silica.

In addition to the foregoing materials, the SM-3 produced can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia, silica-alumina-magnesia, and silica-magnesia-zirconia. The relative proportions of finely divided crystalline SM-3 material and inorganic oxide gel matrix vary widely, with the crystal content ranging from 1 to 90% by weight and more usually, particularly when the composite is prepared in the form of beads, in the range of 2 to 80 weight percent of the composite.

The crystalline material produced by the present process is readily convertible to catalytically active material for a variety of organic, e.g., hydrocarbon compound conversion processes.

SM-3 catalyst, when containing a hydrogenation promoter, can be used in a process for selectively producing middle distillate hydrocarbons by hydrocracking a hydrocarbonaceous feed wherein at least 90% of the feed has a boiling point above about 600° F. The hydrocracking conditions include reaction temperatures which generally exceed about 500° F. (260° C.) and are usually above about 600° F. (316° C.), preferably between 600° F. (316° C.) and 900° F. (482° C.). Hydrogen addition rates should be at least about 400, and are usually between about 1,000 and about 15,000 standard cubic feet per barrel. Reaction pressures exceed 200 psig (13.7 bar) and are usually within the range of about 500 to about 3000 psig (32.4 to 207 bar). Liquid hourly space velocities are less than about 15, preferably between about 0.2 and about 10.

The conditions should be chosen so that the overall conversion rate will correspond to the production of at least about 40%, and preferably at least about 50% of products boiling below about 725° F. (385° C.) per pass and preferably below about 725° F. and above about 300° F. Midbarrel selectivity should be such that at least about 40%, preferably at least about 50% of the product is in the middle distillate range and preferably below about 725° F. and above about 300° F. The process can maintain conversion levels in excess of about 50% per pass at selectivities in excess of 60% to middle distillate products boiling between 300° F. (149° C.) and 725° F. (385° C.). The pour point of the middle distillate effluent obtained by the process will be below about 0° F. and preferably below −20° F.

The process can be operated as a single-stage hydroprocessing zone. It can also be the second stage of a two-stage hydrocracking scheme in which the first stage removes nitrogen and sulfur from the feedstock before contact with the middle distillate-producing catalyst The catalyst can also be used in the first stage of a multistep hydrocracking scheme. In operation as the first stage, the middle distillate-producing zone also denitrifies and desulfurizes the feedstock; in addition, it allows the second stage using the same catalyst or a conventional hydrocracking catalyst to operate more efficiently so that more middle distillates are produced overall than in other process configurations.

In the process of the invention, the hydrocarbon feedstock is heated with the catalyst under conversion conditions which are appropriate for hydrocracking. During the conversion, the aromatics and naphthenes which are present in the feedstock undergo hydrocracking reactions such as dealkylation, ring opening, and cracking, followed by hydrogenation. The long-chain paraffins, which are present in the feedstock, undergo mild cracking reactions to yield non-waxy products of higher molecular weight than compared to products obtained using the prior art dewaxing zeolitic catalysts such as ZSM-5, and at the same time, a measure of isomerization takes place so that not only is the pour point reduced by reason of the cracking reactions described above, but in addition the n-paraffins become isomerized to isoparaffins to form liquid-range materials which contribute to low viscosity, lower pour point products.

The feedstock for the process of the invention comprises a heavy hydrocarbon oil such as a gas oil, coker tower bottoms fractions, reduced crude, vacuum tower bottoms, deasphalted vacuum resids, FCC tower bottoms, or cycle oils. Oils derived from coal, shale, or tar sands may also be treated in this way. Oils of this kind generally boil above 600° F. (316° C.) although the process is also useful with oils which have initial boiling points as low as 436° F. (260° C.). Preferably at least 90% of the feed will boil above 600° F. (316° C.) and most preferably at least about 90% of the feed will boil between 700° F. (371° C.) and about 1200° F. (649° C.). These heavy oils comprise high molecular weight long-chain paraffins and high molecular weight ring compounds with a large proportion of fused ring compounds. During the processing, both the fused ring aromatics and naphthenes and paraffinic compounds are cracked by the SM-3 containing catalyst to middle distillate range products. A substantial fraction of the paraffinic components of the initial feedstock also undergo conversion to isoparaffins.

The process is of particular utility with highly paraffinic feeds because, with feeds of this kind, the greatest improvement in pour point may be obtained. However, most feeds will contain a certain content of polycyclic compounds.

The process enables heavy feedstocks, such as gas oils, boiling above 600° F. to be more selectively converted to middle distillate range products having improved pour points in contrast to prior processes using large pore catalysts, such as zeolite Y.

The hydrocracking catalysts contain an effective amount of at least one hydrogenation catalyst (component) of the type commonly employed in hydrocracking catalysts. The hydrogenation component is generally selected from the group of hydrogenation catalysts consisting of one or more metals of Group VIB and Group VIII, including the salts, complexes, and solutions containing such. The hydrogenation catalyst is preferably selected from the group of metals, salts, and complexes thereof of the group consisting of at least one of platinum, palladium, rhodium, iridium, and mixtures thereof or the group consisting of at least one of nickel, molybdenum, cobalt, tungsten, titanium, chromium, and mixtures thereof. Reference to the catalytically active metal or metals is intended to encompass such metal or metals in the elemental state or in some form such as an oxide, sulfide, halide, carboxylate, and the like.

The hydrogenation catalyst is present in an effective amount to provide the hydrogenation function of the hydrocracking catalyst, and preferably in the range of from 0.05 to 25% by weight.

The SM-3 may be employed in conjunction with traditional hydrocracking catalysts, e.g., any aluminosilicate heretofore employed as a component in hydrocracking catalysts. Representative of the zeolitic aluminosilicates disclosed heretofore as employable as component parts of hydrocracking catalysts are Zeolite Y (including steam stabilized, e.g., ultra-stable Y), Zeolite X, Zeolite beta (U.S. Pat. No. 3,308,069), Zeolite ZK-20 (U.S. Pat. No. 3,445,727), Zeolite ZSM-3 (U.S. Pat. No. 3,415,736), faujasite, LZ-10 (U.K. Patent No. 2,014,970, June 9, 1982), ZSM-5-type zeolites, e.g., ZSM-5, ZSM-11, ZSM-12, ZSM-23, ZSM-35, ZSM-38, ZSM-48, crystalline silicates such as silicalite (U.S. Pat. No. 4,061,724), erionite, mordenite, offretite, chabazite, FU-1-type zeolite, NU-type zeolites, LZ-210-type zeolite, and mixtures thereof. Traditional cracking catalysts containing amounts of $Na_2O$ less than about 1% by weight are generally preferred. The relative amounts of the SM-3 component and traditional hydrocracking component, if any, will depend, at least in part, on the selected hydrocarbon feedstock and on the desired product distribution to be obtained therefrom, but in all instances an effective amount of SM-3 is employed. When a traditional hydrocracking catalyst (THC) component is employed, the relative weight ratio of the THC to the SM-3 is generally between about 1:10 and about 500:1, desirably between about 1:10 and about 200:1, preferably between about 1:2 and about 50:1, and most preferably is between about 1:1 and about 20:1.

The hydrocracking catalysts are typically employed with an inorganic oxide matrix component which may be any of the inorganic oxide matrix components which have been employed heretofore in the formulation of hydrocracking catalysts including: amorphous catalytic inorganic oxides, e.g., catalytically active silica-aluminas, clays, silicas, aluminas, silica-aluminas, silica-zirconias, silica-magnesias, alumina-borias, alumina-titanias and the like, and mixtures thereof. The traditional hydrocracking catalyst and SM-3 may be mixed separately with the matrix component and then mixed or the THC component and SM-3 may be mixed and then formed with the matrix component.

SM-3 can be used in a process to dewax hydrocarbonaceous feeds. The catalytic dewaxing conditions are dependent in large measure on the feed used and upon the desired pour point. Generally, the temperature will be between about 200° C. and about 475° C., preferably between about 250° C. and about 450° C. The pressure is typically between about 15 psig and about 3000 psig, preferably between about 200 psig and 3000 psig. The liquid hourly space velocity (LHSV) preferably will be from 0.1 to 20, preferably between about 0.2 and about 10.

Hydrogen is preferably present in the reaction zone during the catalytic dewaxing process. The hydrogen to feed ratio is typically between about 500 and about 30,000 SCF/bbl (standard cubic feet per barrel), preferably about 1000 to about 20,000 SCF/bbl. Generally, hydrogen will be separated from the product and recycled to the reaction zone.

It has been found that the present process provides selective conversion of waxy n-paraffins to non-waxy paraffins. During processing the waxy paraffins undergo mild cracking reactions to yield non-waxy products of higher molecular weight than compared to products obtained using the prior art zeolitic catalyst. At the same time, a measure of isomerization takes place, so that not only is the pour point reduced by reason of the cracking reactions described above, but in addition the n-paraffins become isomerized to iso-paraffins to form liquid range materials which contribute to a low viscosity, low pour point product.

The present process may be used to dewax a variety of feedstocks ranging from relatively light distillate fractions up to high boiling stocks such as whole crude petroleum, reduced crudes, vacuum tower residua, cycle oils, synthetic crudes (e.g., shale oils, tar sand oils, etc.), gas oils, vacuum gas oils, foot oils, and other heavy oils. The feedstock will normally be a $C_{10}+$ feedstock generally boiling above about 350° F. since lighter oils will usually be free of significant quantities of waxy components. However, the process is particularly useful with waxy distillate stocks such as middle distillate stocks including gas oils, kerosenes, and jet fuels, lubricating oil stocks, heating oils and other distillation fractions whose pour point and viscosity need to be maintained within certain specification limits. Lubricating oil stocks will generally boil above 230° C. (450° F.), more usually above 315° C. (600° F.). Hydroprocessed stocks which include stocks which have been hydrotreated to lower metals, nitrogen and sulfur levels and/or hydrocracked, are a convenient source of stocks of this kind and also of other distillate fractions since they normally contain significant amounts of waxy n-paraffins. The feedstock of the present process will normally be a $C_{10}+$ feedstock containing paraffins, olefins, naphthenes, aromatics, and heterocyclic compounds and with a substantial proportion of higher molecular weight n-paraffins and slightly branched paraffins which contribute to the waxy nature of the feedstock. During the processing, the n-paraffins and the slightly branched paraffins undergo some cracking or hydrocracking to form liquid range materials which contribute to a low viscosity product. The degree of cracking which occurs is, however, limited so that the gas yield is reduced, thereby preserving the economic value of the feedstock.

Typical feedstocks include light gas oils, heavy gas oils, and reduced crudes boiling above 350° F.

While the process herein can be practiced with utility when the feed contains organic nitrogen (nitrogen-containing impurities), it is preferred that the organic nitrogen content of the feed be less than 50, more preferably less than 10, ppmw.

When used in the present process, the SM-3 is employed in admixture with at least one Group VIII metal as, for example, the noble metals such as platinum and palladium, and optionally other catalytically active metals such as molybdenum, vanadium, zinc, etc. The amount of metal ranges from about 0.01% to 10% and preferably 0.2 to 5% by weight of the molecular sieve.

The Group VIII metal utilized in the process of this invention can mean one or more of the metals in its elemental state or in some form such as the sulfide or oxide and mixtures thereof. As is customary in the art of catalysis, when referring to the active metal or metals, it is intended to encompass the existence of such metal in the elementary state or in some form such as the oxide or sulfide as mentioned above, and regardless of the state in which the metallic component actually exists, the concentrations are computed as if they existed in the elemental state.

The SM-3 silicoaluminophosphate molecular sieve can be composited with other materials resistant to the temperatures and other conditions employed in the dewaxing process. Such matrix materials include active and inactive materials and synthetic or naturally occurring zeolites as well as inorganic materials such as clays, silica, alumina, and metal oxides. Examples of zeolites include synthetic and natural faujasites (e.g., X and Y), erionites, mordenites, and those of the ZSM series, e.g., ZSM-5, etc. The combination of zeolites can also be composited in a porous inorganic matrix.

SM-3 can be used in a process to prepare lubricating oils. The process comprises (a) hydrocracking in a hydrocracking zone a hydrocarbonaceous feedstock to obtain an effluent comprising a hydrocracked oil; and (b) catalytically dewaxing in a catalytic dewaxing zone the hydrocracked oil of step (a) with a catalyst comprising a crystalline silicoaluminophosphate SM-3 and a Group VIII metal, preferably platinum or palladium.

Another embodiment of this process includes an additional step of stabilizing said dewaxed hydrocrackate by catalytic hydrofinishing.

The hydrocarbonaceous feeds from which lube oils are made usually contain aromatic compounds as well as normal and branched paraffins of very long chain lengths. These feeds usually boil in the gas oil range. Preferred feedstocks are vacuum gas oils with normal boiling ranges in the range of 350° C. to 600° C., and deasphalted residual oils having normal boiling ranges from about 480° C. to 650° C. Reduced topped crude oils, shale oils, liquified coal, coke distillates, flask or thermally cracked oils, atmospheric residua, and other heavy oils can also be used. The first step in the processing scheme is hydrocracking. In commercial operations, hydrocracking can take place as a single-step process, or as a multistep process using initial denitrification or desulfurization steps, all of which are well known.

Typically, hydrocracking process conditions include temperatures in the range of 250° C. to 500° C., pressures in the range of about 425 to 3000 psig, or more, a hydrogen recycle rate of 400 to 15,000 SCF/bbl, and a LHSV (v/v/hr) of 0.1 to 50.

During the hydrocracking step there are conversions of at least 10% to products boiling below 350° C. Catalysts employed in the hydrocracking zone or zones include those having hydrogenation-dehydrogenation activity, and active cracking supports. The support is often a refractory inorganic oxide such as silica-alumina, silica-alumina-zirconia and silica-alumina-titania composites, acid-treated clays, crystalline aluminosilicate zeolitic molecular sieves (such as Zeolite A, faujasite, Zeolite X, and Zeolite Y), and combinations of the above.

Hydrogenation-dehydrogenation components of the hydrocracking catalyst usually comprise metals selected from Group VIII and Group VIB of the Periodic Table, and compounds including them. Preferred Group VIII components include cobalt, nickel, platinum, and palladium, particularly the oxides and sulfides of cobalt and nickel. Preferred Group VIB components are the oxides and sulfides of molybdenum and tungsten. Thus, examples of hydrocracking catalysts which are preferred for use in the hydrocracking step are the combinations nickel-tungsten-silica-alumina and nickel-molybdenum-silica-alumina.

A particularly preferred hydrocracking catalyst for use in the present process is nickel sulfide/tungsten sulfide on a silica-alumina base which contains discrete metal phosphate particles (described in U.S. Pat. No. 3,493,517, incorporated herein by reference).

The nitrogen content of the hydrocrackate is as low as is consistent with economical refinery operations, but is preferably less than 50 ppm (w/w), and more preferably less than about 10 ppm (w/w), and most preferably less than about 1 ppm (w/w).

The hydrocracking step yields two significant benefits. First, by lowering the nitrogen content, it dramatically increases the efficiency and ease of the catalytic dewaxing step. Second, the viscosity index is greatly increased as the aromatic compounds present in the feed, especially the polycyclic aromatics, are opened and hydrogenated. In the hydrocracking step, increases of at least 10 VI units will occur in the lube oil fraction, i.e., that fraction boiling above 230° C. and more preferably above 315° C.

The hydrocrackate is preferably distilled by conventional means to remove those products boiling below 230° C., and more preferably below 315° C. to yield one or more lube oil boiling range streams. Depending upon the particular lube oil desired, for example, a light, medium, or heavy lube oil, the raw hydrocrackate may be distilled into light, medium, or heavy oil fractions. Among the lower boiling products removed are light nitrogen containing compounds such as $NH_3$. This yields a lube oil stream with a reduced nitrogen level, so that the SM-3 crystalline silicoaluminophosphate molecular sieve in the dewaxing catalyst achieves maximum activity in the dewaxing step. Lubricating oils of different boiling ranges can be prepared by the process of this invention. These would include light neutral, medium neutral, heavy natural, and bright stock, where the neutral oils are prepared from distillate fractions and bright stock from residual fractions.

The great efficiency of the present invention comes in part from the combination of hydrocracking to produce a very low nitrogen, high viscosity index stock which is then extremely efficiently dewaxed to achieve a very low pour point and improved viscosity and viscosity index. It can be appreciated that the higher the activity of the dewaxing catalyst, the lower the reactor temperature necessary to achieve a particular degree of dewaxing. A significant benefit is, therefore, the greater energy savings from using the enhanced efficiency catalyst and usually longer cycle life. Additionally, since the SM-3 crystalline silicoaluminophosphate dewaxing catalyst is shape-selective, it reacts preferentially with the waxy components of the feedstock responsible for high pour points, i.e., the normal paraffins as well as the slightly branched paraffins and alkyl-substituted cycloparaffins which comprise the so-called microcrystalline wax.

When used in the present process, the SM-3 silicoaluminophosphate is preferably employed in admixture with at least one of the noble metals platinum, palladium, and optionally other catalytically active metals such as molybdenum, nickel, vanadium, cobalt, tungsten, zinc, etc., and mixtures thereof. The amount of metal ranges from about 0.01% to 10% and preferably 0.2 to 5% by weight of the molecular sieve.

The metal utilized in the process of this invention can mean one or more of the metals in its elemental state or in some form such as the sulfide or oxide and mixtures thereof. As is customary in the art of catalysis, when referring to the active metal or metals it is intended to encompass the existence of such metal in the elementary state or in some form such as the oxide or sulfide as mentioned above, and regardless of the state in which the metallic component actually exists the concentrations are computed as if they existed in the elemental state.

The dewaxing step may be carried out in the same reactor as the hydrocracking step but is preferably carried out in a separate reactor. The catalytic dewaxing conditions are dependent in large measure on the feed used and upon the desired pour point. Generally, the temperature will be between about 200° C. and about 475° C., preferably between about 250° C. and about 450° C. The pressure is typically between about 15 psig and about 3000 psig, preferably between about 200 psig and 3000 psig. The liquid hourly, space velocity (LHSV) preferably will be from 0.1 to 20, preferably between about 0.2 and about 10.

Hydrogen is preferably present in the reaction zone during the catalytic dewaxing process. The hydrogen to feed ratio is typically between about 500 and about 30,000 SCF/bbl (standard cubic feet per barrel), preferably about 1,000 to about 20,000 SCF/bbl. Generally, hydrogen will be separated from the product and recycled to the reaction zone.

The SM-3 crystalline silicoaluminophosphate catalyst used in the dewaxing step provides selective conversion of the waxy components to non-waxy components. During processing the waxy paraffins undergo mild cracking reactions to yield non-waxy products of higher molecular weight than compared to products obtained using the prior art zeolite catalysts. At the same time, a measure of isomerization takes place so that not only is the pour point reduced by reason of the cracking reactions described above, but in addition the waxy components become isomerized to form liquid range materials which contribute to a low viscosity, low pour point product having excellent VI properties.

The SM-3 crystalline silicoaluminophosphate molecular sieve can be composited with other materials resistant to the temperatures and other conditions employed in the dewaxing process. Such matrix materials include active and inactive materials and synthetic or naturally occurring zeolites as well as inorganic materials such as clays, silica, alumina, and metal oxides. Examples of zeolites include synthetic and natural faujasites (e.g., X and Y), erionites, mordenites, and those of the ZSM series, e.g., ZSM-5, etc. The combination of zeolites can also be composited in a porous inorganic matrix.

It is often desirable to use mild hydrogenation (sometimes referred to as hydrofinishing) to produce more stable lubricating oils.

The hydrofinishing step can be performed either before or after the dewaxing step, and preferably after. Hydrofinishing is typically conducted at temperatures ranging from about 190° C. to about 340° C. at pressures from about 400 psig to about 3000 psig at space velocities (LHSV) between about 0.1 and 20 and hydrogen recycle rates of 400 to about 1500 SCF/bbl. The hydrogenation catalyst employed must be active enough not only to hydrogenate the olefins, diolefins, and color bodies within the lube oil fractions, but also to reduce the aromatic content. The hydrofinishing step is beneficial in preparing an acceptably stable lubricating oil since lubricant oils prepared from hydrocracked stocks tend to be unstable to air and light and tend to form sludges spontaneously and quickly.

Suitable hydrogenation catalysts include conventional metallic hydrogenation catalysts, particularly the Group VIII metals such as cobalt, nickel, palladium, and platinum. The metal is typically associated with carriers such as bauxite, alumina, silica gel, silica-alumina composites, and crystalline aluminosilicate zeolites. Palladium is a particularly preferred hydrogenation metal. If desired, non-noble Group VIII metals can be used with molybdates. Metal oxides or sulfides can be used. Suitable catalysts are detailed, for instance, in U.S. Pat. Nos. 3,852,207; 4,157,294; 3,904,153; and 4,673,487, all of which are incorporated herein by reference.

The improved process of this invention will now be illustrated by examples which are not to be construed as limiting the invention as described in this specification including the attached claims.

EXAMPLES

EXAMPLES 1-5

Five preparations of SM-3 were made which had bulk $SiO_2/Al_2O_3$ ratios of 0.375±0.005 but different surface ratios. These were made as follows:

EXAMPLE 1

231.2 g of 85% $H_3PO_4$ were added to 118 g of distilled $H_2O$ in a Teflon beaker, with the beaker in an ice bath. 408.4 g of aluminum isopropoxide ($Al[OC_3H_7]_3$) were slowly added with mixing and then mixed until homogeneous. Then 38 g of fumed silica (Cabosil M-5) in 168 g of distilled water were added with mixing. Next, 91.2 g of di-n-propylamine ($Pr_2NH$) were added followed by mixing with a Polytron. The mixture had a pH of 6.0 and the following composition, expressed in molar ratios of oxides:

$$0.9Pr_2NH:0.6SiO_2:Al_2O_3:R_2O_5:18H_2O$$

The mixture was placed in a Teflon bottle in a stainless steel pressure vessel and heated for 5 days at 200° C. with no stirring and autogenous pressure. The supernatant liquid was removed and the product was filtered, washed with water, dried overnight at 127° C., and calcined in air for 8 hours at 538° C. The average crystallite size was less than 0.5 micron.

EXAMPLE 2

462.4 g of 85% H were added to 236 g of distilled water in a Teflon beaker, with the beaker cooled in an ice bath. 816.8 g of $Al(OC_3H_7)_3$ were slowly added with mixing and then mixed until homogeneous. Then 120 g of Cabosil HS-5 in 480 g of distilled water were added with mixing and mixed for 15 minutes. 182.4 g of di-n-propylamine were then added and mixed for about 15 minutes. The mixture had a pH of 6.4 and the following composition, expressed in molar ratios of oxides:

$$0.9Pr_2NH:SiO_2:Al_2O_3:P_2O_5:22H_2O$$

The mixture was placed in a Teflon bottle in a stainless steel pressure vessel and heated for 5 days at 200° C. with no stirring and autogenous pressure. The supernatant liquid was removed and the product was filtered, washed with water, dried for 8 hours at 121° C., and calcined in air for 8 hours at 566° C. The average crystallite size was less than 0.5 micron.

EXAMPLE 3

231.2 g of 85% H were added to 238 g of distilled $H_2O$ in a Teflon beaker, with the beaker in an ice bath. 408.4 g of $Al(OC_3H_7)_3$ were slowly added with mixing and then mixed until homogeneous with a Polytron. 60 g of Cabosil M-5 were added with mixing and mixed until homogeneous. Then 91.2 g of di-n-propylamine were added with mixing. The pH of the mixture was then adjusted to 6.5 using concentrated HCl. The mixture had a composition, expressed in molar ratios of oxides, of:

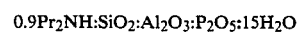

$$0.9Pr_2NH:SiO_2:Al_2O_3:P_2O_5:15H_2O$$

The mixture was placed in a stainless steel pressure vessel with a Teflon insert and heated for 8 days at 200° C. with no stirring and autogenous pressure. The supernatant liquid was removed and the product was filtered, washed with water, dried overnight at 121° C., and calcined in air for 8 hours at 593° C. The average crystallite size was less than 0.5 micron

EXAMPLE 4

472.4 g of 85% H were added to 1208 g of distilled $H_2O$ in a Teflon beaker, with the beaker in an ice bath. 816.8 g of $Al(OC_3H_7)_3$ were added slowly with mixing and then mixed with a Polytron until homogeneous. 120 g of Cabosil M-5 were added with mixing and then mixed for an additional 15 minutes 182.4 g of di-n-propylamine were added with mixing and mixed an additional 15 minutes. Then an additional 9.6 g of 85% $H_3PO_4$ were added with mixing. The mixture had a pH of 6.5 and a composition, expressed in molar ratios of oxides, of:

$$0.9Pr_2NH:SiO_2:Al_2O_3:1.04P_2O_5:36H_2O$$

The mixture was placed in a Teflon bottle in a stainless steel pressure vessel and heated for 5 days at 200° C. with no stirring and autogenous pressure. The supernatant liquid was removed and the product was filtered, washed with water, dried overnight at 121° C., and then calcined in air for 8 hours at 566° C. The average crystallite size was less than 0.5 micron.

EXAMPLE 5

172.4 g of 85% $H_3PO_4$ were added to 1208 g of distilled $H_2O$ in a Teflon beaker, with the beaker in an ice bath. 816.8 g of $Al(OC_3H_7)_3$ were slowly added with mixing and then mixed with a Polytron until homogeneous. 120 g of Cabosil M-5 were added with mixing and mixed an additional 15 minutes 182.4 g of di-n-propylamine were then added and mixed for 15 minutes. An additional 30 g of 85% $H_3PO_4$ were then added with mixing. The mixture had a pH of 6.5 and a composition, expressed in molar ratios of oxides, of:

$$0.9Pr_2NH:1.0SiO_2:Al_2O_3:1.09P_2O_5:36H_2O$$

The mixture was placed in a Teflon bottle in a stainless steel pressure vessel and heated for 5 days at 200° C. with no stirring and autogenous pressure. The supernatant liquid was removed and the product was filtered, washed with water, dried overnight at 121° C., and calcined in air for 8 hours at 566° C. The average crystallite size was less than 0.5 micron.

The X-ray diffraction pattern for each of Examples 1-5 as synthesized and as calcined were characteristic of SAPO-11 as disclosed in Tables I and II, respectively, and in U.S. Pat. No. 4,440,871.

The sieves of Examples 1-5 were impregnated with 1 wt % Pt by the pore-fill method using an aqueous solution of $Pt(NH_3)_4(NO_3)_2$. The sieves were dried overnight at 121° C. and calcined in air for 4 hours at 204° C. and 4 hours at 454° C. They were then tested in a $C_8$ Activity Test, performed as follows:

0.5 g of 24×42 mesh catalyst is placed in a 3/16-inch-I.D. stainless steel reactor with the remaining space filled with acid-washed and neutralized 24-mesh alundum. The reactor is placed in a clam-shell furnace of a high-pressure continuous flow pilot plant equipped with a sampling valve and a Hewlett Packard 5880 gas chromatograph using a capillary column. The catalyst is tested at 1000 psig, 2.8 WHSV, and 16 $H_2$/HC with a feed consisting of a 50/50 by weight mixture of 2,2,4-trimethylpentane and n-octane. The reactor temperature is adjusted to provide a $nC_8$ conversion of 40%.

The $C_8$ Activity Test gives information as to the activity of the catalyst.

ESCA analysis of the sieves of Examples 1-5 prior to impregnation with platinum are given in Table III.

Also, the results of the Activity Tests on the sieves after impregnation with platinum and calcination are given in Table III.

TABLE III
ESCA Analysis and $C_8$ Activity Tests Results

| Example | $P_2O_5$/ $Al_2O_3$, bulk[1] | $P_2O_5$/ $Al_2O_3$, surf.[1] | $SiO_2$/ $Al_2O_3$, bulk[1] | $SiO_2$/ $Al_2O_3$, surf.[1] | Reaction Temperature for 40% $nC_8$ Conversion in $C_8$ Activity Test for Pt-Containing Sieves |
|---|---|---|---|---|---|
| 1 | 1.00 | 0.72 | 0.38 | 1.92 | 595 |
| 2 | 1.00 | 0.72 | 0.37 | 2.00 | 580 |
| 3 | 1.00 | 0.77 | 0.38 | 1.98 | 592 |
| 4 | 1.00 | 0.72 | 0.37 | 2.40 | 557 |
| 5 | 0.99 | 0.73 | 0.37 | 3.36 | 530 |

[1]Mole ratios

EXAMPLES 6–9

The preparations of Examples 6, 7 and 8 below were made in which the reaction mixture had the molar composition, expressed as oxides, of:

$$0.9Pr_2NH:0.6SiO_2:Al_2O_3:P_2O_5:bH_2O$$

where b was varied. The product $SiO_2/Al_2O_3$ bulk ratio was 0.20±0.02. Example 9 below corresponds to Example 17 of U.S. Pat. No. 4,440,877.

EXAMPLE 6

115.6 g of 85% $H_3PO_4$ were added to 59 g of distilled water in a Teflon beaker, with the beaker in an ice bath. 204.2 g of Al(OC)3 were slowly added with mixing and then mixed until homogeneous. Then 19 g of Cabosil M-5 in 42 g of distilled $H_2O$ were added with mixing. 45.6 g of di-n-propylamine were added and mixed with a Polytron. The mixture had a pH of 6.0 and an $H_2O$/$Al_2O_3$ molar ratio of 13. The mixture was placed in a Teflon bottle in a stainless steel pressure vessel and heated for 5 days at 200° C. with no stirring and autogenous pressure. The supernatant liquid was removed and the product was filtered, washed with water, dried overnight at 121° C., and calcined for 8 hours in air at 538° C. The average crystallite size was less than 0.5 micron.

EXAMPLE 7

SM-3 was prepared as in Example 6, but enough distilled water was added to the $H_3PO_4$ to bring the mixture $H_2O$/$Al_2O_3$ molar ratio up to 33. The reaction mixture pH was 6.1. The average crystallite size was about 0.5 micron.

COMPARATIVE EXAMPLE 8

A sieve was prepared as in Example 6, but enough distilled water was added to the $H_3PO_4$ to bring the mixture $H_2O/A_2O_3$ molar ratio up to 62 and outside the range of the invention. The reaction mixture pH (7.5) was lowered to 6.5 by addition of concentrated HCl. The average crystallite size was in the range of 0.5 micron.

COMPARATIVE EXAMPLE 9

A SAPO-11 silicoaluminophosphate was prepared following the procedure of Example 17 of U.S. Pat. No. 4,440,871, using two times the quantities of materials as indicated therein. The reaction mixture pH was 10.7. The average crystallite size was less than about 1 micron. The X-ray diffraction pattern for each of Examples 6–9 as synthesized and as calcined were characteristic of SAPO-11 as disclosed in Tables I and II respectively and in U.S. Pat. No. 4,440,871.

The sieves of Examples 6–9 were impregnated with platinum and calcined as in Examples 1–5.

ESCA sieve analysis for Examples 6–9 prior to impregnation with platinum are shown in Table IV. Also, the Activity Test date for the sieves of Examples 6–9 after impregnation with platinum and calcination are shown in Table IV.

TABLE IV

ESCA Analysis and $C_8$ Activity Test

| Example | $(H_2O/Al_2O_3)^{(1)}$ | $P_2O_5/Al_2O_3$, bulk$^{(1)}$ | $P_2O_5/Al_2O_3$, surf.$^{(1)}$ | $SiO_2/Al_2O_3$, bulk$^{(1)}$ | $SiO_2/Al_2O_3$, surf.$^{(1)}$ | Reaction Temperature for 40% $nC_8$ Conversion in $C_8$ Activity Test for Pt-Containing Sieves |
|---|---|---|---|---|---|---|
| 6 | 13 | 1.0 | 0.72 | 0.22 | 0.94 | 585 |
| 7 | 33 | 0.99 | 0.71 | 0.21 | 0.74 | 600 |
| 8 | 62 | 0.81 | 0.58 | 0.18 | 0.40 | 630 |
| 9 | 17$^{(2)}$ | 0.85 | 0.45 | 0.57 | 1.34 | 736 |

$^{(1)}$Mole ratios
$^{(2)}$plus 24 methanol/$Al_2O_3$

The sieves of Examples 6 and 7, which are within the scope of the invention with respect to the $P_2O_5/Al_2O_3$ mole ratio and $SiO_2/Al_2O_3$ mole ratio in the bulk and at the surface show improved activity compared to Examples 8 and 9 which are outside the scope of this invention.

What is claimed is:

1. A crystalline silicoaluminophosphate molecular sieve having a characteristic X-ray powder diffraction pattern which contains at least the d-spacings of Table I, and wherein the $P_2O_5$ to alumina mole ratio at the surface of the silicoaluminophosphate is about 0.80 or less, the $P_2O_5$ to alumina mole ratio of the bulk of the silicoaluminophosphate is 0.96 or greater, and the $SiO_2$ to alumina mole ratio at the surface is greater than in the bulk of the silicoaluminophosphate.

2. A crystalline silicoaluminophosphate molecular sieve having a composition in terms of mole ratios of oxides on an anhydrous basis expressed by the formula:

$$mR:Al_2O_3:nP_2O_5:qSiO_2$$

wherein "R" represents at least one organic templating agent present in the intracrystalline pore system; "m" represents the moles of "R" present and has a value such that there are from 0.02 to 2 moles of R per mole of aluminum; n has a value of from 0.96 to 1.1, and q has a value of from 0.1 to 4, said silicoaluminophosphate having a characteristic X-ray powder diffraction pattern which contains at least the d-spacings of Table I, and wherein the $P_2O_5$ to alumina mole ratio of the surface of the silicoaluminophosphate is about 0.80 or less, the $P_2O_5$ to alumina mole ratio of the bulk of the silicoaluminophosphate is 0.96 or greater, and the $SiO_2$ to alumina mole ratio at the surface of the silicoaluminophosphate is greater than the $SiO_2$ to alumina mole ratio in the bulk of the silicoaluminophosphate.

3. The silicoaluminophosphate of claim 2 wherein m has a value of from 0.4 to 1.5; n has a value of from 0.96 to 1; and q has a value of from 0.1 to 1.

4. The silicoaluminophosphate of claim 2 or 3 wherein the organic templating agent is selected from the group consisting of di-n-propylamine and diisopropylamine or a mixture thereof.

5. The silicoaluminophosphate of claim 1, 2 or 3 wherein the $P_2O_5$ to alumina mole ratio at the surface is in the range of from about 0.80 to about 0.55 and the $P_2O_5$ to alumina mole ratio of the bulk is in the range of from about 0.96 to 1.

6. The silicoaluminophosphate resulting from the thermal treatment of the silicoaluminophosphate of claim 1.

7. The silicoaluminophosphate resulting from the thermal treatment of the silicoaluminophosphate of claim 2.

8. The silicoaluminophosphate resulting from the thermal treatment of the silicoaluminophosphate of claim 3.

9. The silicoaluminophosphate of claim 6, 7 or 8 wherein having the characteristic X-ray powder diffraction pattern shown in Table II.

10. A process for preparing a crystalline silicoaluminophosphate according to claim 1 which comprises
    (a) preparing an aqueous reaction mixture containing a reactive source of $SiO_2$, aluminum isopropoxide, phosphoric acid, and an organic templating agent, said reaction mixture having a composition expressed in terms of mole ratios of oxides of:

$$aR:Al_2O_3:0.9-1.2P_2O_5:0.1-4.0SiO_2:bH_2O$$

wherein R is an organic templating agent; "a" has a value large enough to constitute an effective amount of R; "b" has a value such that there are 10 to 40 moles of $H_2O$ per mole of aluminum oxide; said reaction mixture having been formed by combining the alumina and phosphorus sources in the substantial absence of the silicon source, thereafter combining the resulting mixture with the silicon source, and then combining this mixture with the organic templating agent to form the complete reaction mixture;
    (b) insuring the pH of the reaction mixture is from about 6.0 to 8.5;
    (c) heating the reaction mixture to a temperature in the range of from 170° C. to 240° C. until crystals of silicoaluminophosphate are formed; and
    (d) recovering said crystals.

11. The process of claim 10 wherein "b" has a value such that there are 15 to 36 moles of $H_2O$ per mole of alumina.

12. The process of claim 10 wherein "a" has a value such that there are from 0.2 to 2 moles of R per mole of alumina.

13. The process of claim 10 wherein "a" has a value such that there are from 0.8 to 1.2 moles of R per mole of alumina.

14. The process of claim 10 wherein the organic templating agent is selected from the group consisting of di-n-propylamine and diisopropylamine or a mixture thereof.

15. The process of claim 10 wherein the organic template is di-n-propylamine.

16. The process of claim 10 wherein the pH is in the range of 6.0 to 8.0.

17. The process of claim 10 wherein the crystallite size of the recovered crystals are less than 1 micron.

18. The process of claim 10 wherein the average crystallite size of the recovered crystals are less than 0.5 micron.

19. The process of claim 10 wherein the temperature ranges from 200° C. to 225° C.

* * * * *